(No Model.)
A. ANDERSON.
KNIFE AND CORN HOLDER.
No. 562,946. Patented June 30, 1896.
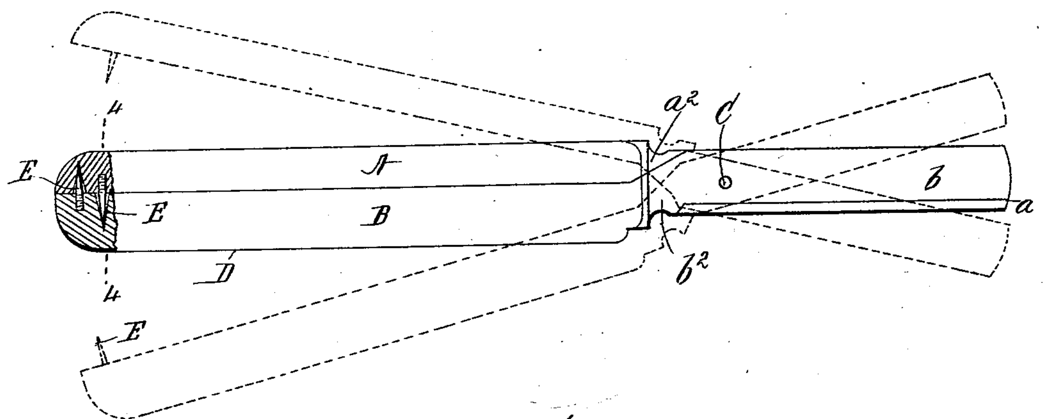
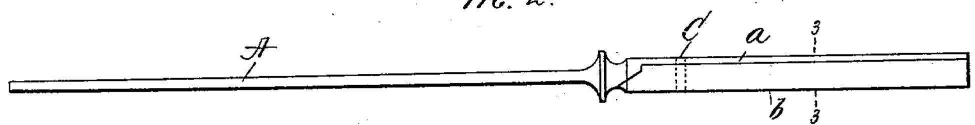
FIG. 3.
FIG. 4.
FIG. 5.
WITNESSES:
John Buckler,
C. Gerst
INVENTOR
Albin Anderson,
BY
Edgar Tate & Co
ATTORNEYS.
ANDREW B. GRAHAM, PHOTO-LITHO. WASHINGTON, D.C.

UNITED STATES PATENT OFFICE.

ALBIN ANDERSON, OF NEW YORK, N. Y.

KNIFE AND CORN-HOLDER.

SPECIFICATION forming part of Letters Patent No. 562,946, dated June 30, 1896.

Application filed March 7, 1896. Serial No. 582,210. (No model.)

*To all whom it may concern:*

Be it known that I, ALBIN ANDERSON, a citizen of the United States, and a resident of New York, in the county of New York and State of New York, have invented certain new and useful Improvements in Knives and Corn-Holders, of which the following is a specification, reference being had to the accompanying drawings, forming a part thereof, in which similar letters of reference indicate corresponding parts.

This invention relates to knives and corn-holders, and the object thereof is to provide a combined device of this class which is simple in construction and operation, and which while being adapted to serve as an ordinary table-knife may also be used as a corn-holder, whereby an ear of corn may be manipulated without applying the hands thereto.

The invention is fully disclosed in the following specification, of which the accompanying drawings form a part, in which—

Figure 1 is a side view of my improved knife and corn-holder, a part thereof being shown in section, the device being shown in full lines as when used as a knife and in dotted lines as when used as a corn-holder; Fig. 2, an edge view thereof; Fig. 3, a section on the line 3 3; Fig. 4, a section on the line 4 4, and Fig. 5 an end view of the handle.

In the practice of my invention I provide a knife and corn-holder which consists of two separate blades A and B, which are provided with handles *a* and *b*, respectively, which are pivoted together at C, and between the pivotal connection at C and the ends of the blades proper are formed transverse inclined shanks $a^2$ and $b^2$, and the adjacent sides or faces of the handles are also longitudinally inclined, as shown at C in Fig. 3.

One of the blades is provided with a cutting edge, as shown at D, and each blade is provided at its free end with a spike or pin E, which is adapted to enter a corresponding hole formed in the opposite blade, and the end of one of the handles is provided with a shoulder or projection G, which is adapted to enter a corresponding notch or recess formed in the end of the other handle, as shown in Fig. 5.

This device, when the separate blades are in the position shown in Fig. 1, is adapted to be used as an ordinary table-knife, and the same may also be used as a corn-holder by simply separating the blades, as shown in dotted lines in Fig. 1, and by placing the ear of corn or the end thereof between the same, in which position said ear of corn will be held by the spikes or pins E.

This device is simple in construction and comparatively inexpensive, and my invention is not limited to the exact form, construction, and arrangement of parts herein described, and I reserve the right to make all such alterations therein, and modifications thereof, as fairly come within the scope of the invention.

Having fully described my invention, I claim as new and desire to secure by Letters Patent—

A combined knife and corn-holder, substantially as herein shown and described, consisting of the blade divided into two longitudinal sections A and B from which project pins E adapted to enter ports or recesses in the opposite section, said sections being provided with handles *a* and *b* which are pivoted at C, one section being provided with a cutting edge, whereby the device may be used as a knife or as a corn-holder, as herein set forth and described.

In testimony that I claim the foregoing as my invention I have signed my name, in presence of the subscribing witnesses, this 5th day of March, 1896.

ALBIN ANDERSON.

Witnesses:
C. GERST,
F. V. KIRCHHOFF.